(12) United States Patent
Shimizu

(10) Patent No.: US 8,480,152 B2
(45) Date of Patent: Jul. 9, 2013

(54) STORAGE ASSIST DEVICE FOR VEHICLE SEAT

(75) Inventor: Shuichi Shimizu, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 280 days.

(21) Appl. No.: 12/889,991

(22) Filed: Sep. 24, 2010

(65) Prior Publication Data

US 2011/0080029 A1 Apr. 7, 2011

(30) Foreign Application Priority Data

Oct. 7, 2009 (JP) .................................. 2009-233633

(51) Int. Cl.
*B60J 7/00* (2006.01)
(52) U.S. Cl.
USPC ..................................... 296/65.09; 297/344.1
(58) Field of Classification Search
USPC .......................... 296/65.09; 297/344.1, 344.25
See application file for complete search history.

(56) References Cited

U.S. PATENT DOCUMENTS

| | | | | |
|---|---|---|---|---|
| 4,869,541 A | * | 9/1989 | Wainwright | ............... 296/65.09 |
| 7,631,938 B2 | * | 12/2009 | Tomandl | ........................ 297/336 |
| 8,172,325 B2 | * | 5/2012 | Mather et al. | ................. 297/334 |

FOREIGN PATENT DOCUMENTS

JP        06-144092 A    5/1994

* cited by examiner

*Primary Examiner* — Joseph Pape
(74) *Attorney, Agent, or Firm* — Drinker Biddle & Reath LLP

(57) ABSTRACT

A storage assist device for a vehicle seat selectively changes in position between a use and a storage position. The device includes a supporting member for supporting a rotating shaft fixed to the seat cushion; a link member having a fixed portion fixed to the rotating shaft and an engagement portion provided at a position spaced from the fixed portion; a fixing member provided on the vehicle body floor side and disposed at a predetermined distance from the rotating shaft; and an urging spring mounted in a tensioned condition between the engagement portion of the link member and the fixing member that can apply the urging force in the urging direction. The link member is fixed to the rotating shaft such that the entire length of the urging spring is shortest when the seat center of gravity is located on a vertical surface including the rotating shaft.

10 Claims, 11 Drawing Sheets

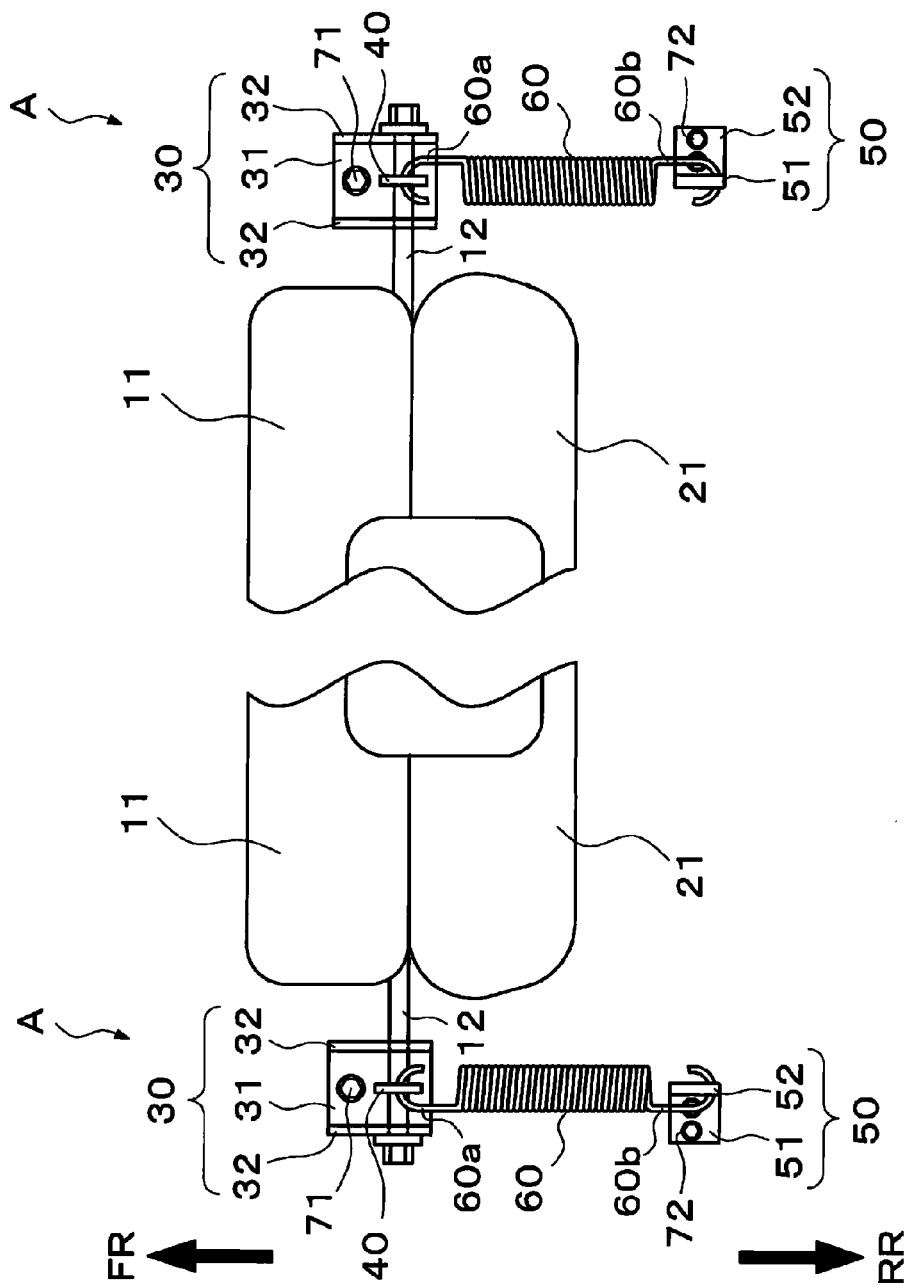

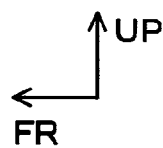
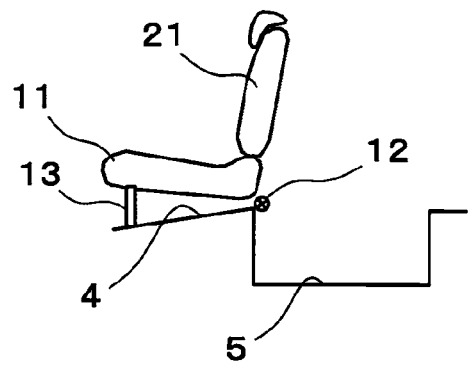
FIG. 7A
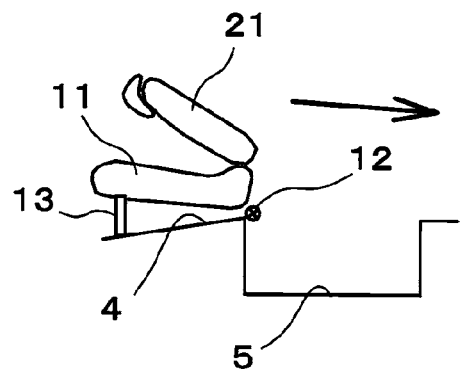
FIG. 7B
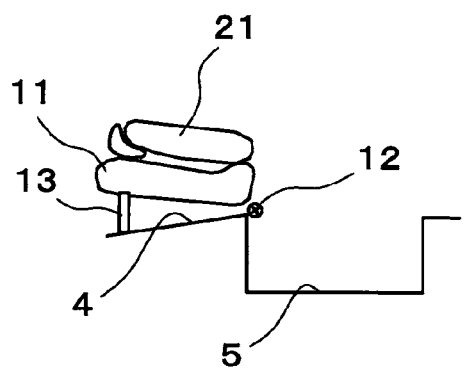
FIG. 7C
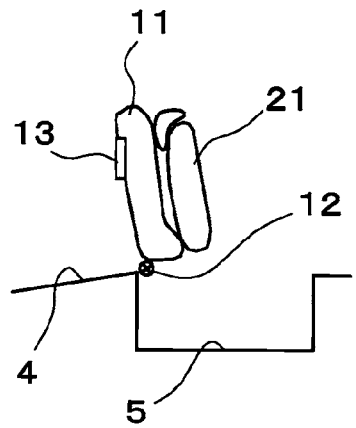
FIG. 7D
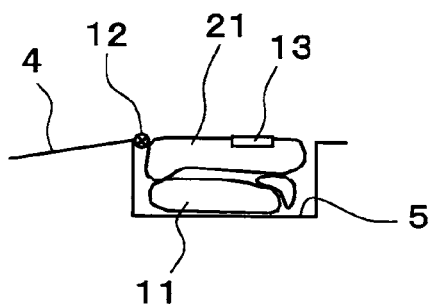
FIG. 7E

STORAGE ASSIST DEVICE FOR VEHICLE SEAT

CROSS REFERENCE TO RELATED APPLICATIONS

This application claims the benefit of Japanese Patent Application No. 2009-233633, filed Oct. 7, 2009, the entire content of which is incorporated herein by reference.

BACKGROUND

The present invention relates to a storage assist device for vehicle seat. More particularly, it relates to a storage assist device for vehicle seat that is rotatable in a front and rear direction in a state where a seat back is folded onto a seat cushion.

Conventionally, in a vehicle provided with rear seats such as the second-row or the third-row seat, there is known a vehicle seat which is rotated to the rear of the vehicle seat that is stored in a storage recess portion formed in a vehicle body floor in a state where the rear ends of a seat cushion constituting the vehicle seat is rotatably supported in the front and rear direction in front side of the storage recess portion and the seat back is folded onto the seat cushion.

Generally, in such a vehicle seat, when it is moved from a use position to a storage position, or when it is moved from the storage position to the use position, the vehicle seat is rotated as a heavy object around a rotating shaft. Therefore, the strong operation force in a rotating direction of the vehicle seat is required until the center of gravity of the vehicle seat reaches on a vertical surface including the rotating shaft, and, after it reaches thereon, the operation force for storing the vehicle seat while suppressing an increase in a rotational speed of the vehicle seat by its own weight is required, so that the vehicle seat had low operability.

Then, for example, there has been proposed a storage assist device provided with a torsion spring that accumulates a restoring force on a rotating shaft attached to a seat cushion, in both cases when a vehicle seat is moved from a use position to a storage position and moved from the storage position to the use position (refer to Japanese Unexamined Patent Application Publication No. H06(1994)-144092 ("the '092 Publication")).

According to such a storage assist device, in both cases when the vehicle seat is moved from the use position to the storage position and moved from the storage position to the use position, since the operation of the vehicle seat can be assisted by the restoring force of the torsion spring, it is possible to reduce the operation load and the rotational speed of the vehicle seat (hereinafter referred to as "the rotating operation force of the vehicle seat").

However, in the storage assist device described in the '092 Publication, since the reduction of the rotating operation force of the vehicle seat is achieved by the urging force of the torsion spring, in a case where the urging force of the torsion spring is strong, the operation load of the vehicle seat can be reduced, but after the center of gravity of the vehicle seat reaches on the vertical surface including the rotating shaft, the vehicle seat stops in the middle of rotating in a raised state, which poses a problem in that the seat must be further pushed strongly to be in the storage position or the use position. Particularly, such a state causes a disadvantage in that the vehicle seat is rattled by vibrations during the vehicle running for example, in a state where the vehicle seat is moved to the storage position.

Such a disadvantage can be resolved by setting the urging force of the torsion spring weakly, but in this case, the operation load of the vehicle seat cannot be reduced sufficiently, and after the center of gravity of the vehicle seat reaches on the vertical surface including the rotating shaft, a disadvantage in that the rotational speed by its own weight of the vehicle seat cannot sufficiently be controlled is caused.

Thus, in the storage assist device described in the '092 Publication, the urging force of the torsion spring must be adjusted upon consideration of weight and the like of the vehicle seat, which poses a problem in that the adjustment thereof is very complicated.

Further, in the above-described storage assist device, the torsion spring is stored within a bracket for supporting the rotating shaft rotatably, which poses a problem in that the installation and the replacement of the torsion spring are very complicated.

SUMMARY

Various embodiments of the present invention solve the above-described disadvantages and provide a storage assist device for vehicle seat that can reduce the rotating operation force of the vehicle seat in both the use operation and the storage operation and can easily adjust the rotating operation force of the vehicle seat.

To solve the above-described disadvantages, various embodiments of the present invention provide a storage assist device for vehicle seat that has a seat cushion supported rotatably with respect to a vehicle body floor and a seat back supported foldably with respect to the seat cushion and can selectively change in position between a use position and a storage position in a state where the seat back is folded down, comprising a supporting member mounted on the vehicle body floor side and supporting a rotating shaft fixed to the seat cushion; a link member having a fixed portion fixed to the rotating shaft and an engagement portion provided at a position spaced from the fixed portion; a fixing member provided on the vehicle body floor side and disposed at a position spaced at a predetermined distance from the supporting member; and an urging element mounted between the engagement portion of the link member and the fixing member that can apply the urging force in an urging direction. The urging element is set such that the urging force is minimized when the center of gravity of the vehicle seat is between the use position and the storage position.

As described above, in the above-described configuration, the urging force in the urging direction of the urging element is minimized when the center of gravity of the vehicle seat is between the use position and the storage position. That is to say, in the case where the vehicle seat is moved between the use position and the storage position, until the center of gravity of the vehicle seat reaches a desired reference position between the use position and the storage position, the urging force of the urging element acts on the vehicle seat via the link member and the rotating shaft, so that the operation load of the vehicle seat is reduced. Then, when the center of gravity of the vehicle seat is located at the reference position, the rotate moment by its own weight of the vehicle seat, that is, the operation load of the vehicle seat becomes zero. After the center of gravity of the vehicle seat reaches the reference position including the rotating shaft, the vehicle seat is moved against the urging force in the urging direction of the urging element, so that the vehicle seat can be moved to the use position or the storage position while controlling the rotational speed by its own weight of the vehicle seat. Therefore, the rotating operation force of the vehicle seat can be reduced in both the use operation and the storage operation of the vehicle seat.

Also, in the above-described configuration, along with the rotating operation of the vehicle seat, the urging force of the urging element is reduced until the center of gravity of the vehicle seat reaches the reference position, and the urging force of the urging element is increased after the center of gravity of the vehicle seat reaches the reference position. Thus, depending on the adjustment of the urging force of the urging element, the operation load of the vehicle seat can be also usually set to be zero, for example. Therefore, by such an adjustment, inconveniences such as rising of the vehicle seat can be solved with certainty, and it is also possible to operate the vehicle seat without feeling weight.

Also, the urging member has only to minimize the urging force on the basis of when the center of gravity of the vehicle seat reaches the reference position, so that the adjustment thereof can be performed quite easily.

Further, in the above-described configuration, the urging element is mounted between the engagement portion of the link member and the fixing member which is disposed at a position spaced at a predetermined distance from the supporting member, so that the installation and the replacement thereof can easily be performed. Also, the reduction of the rotating operation force of the vehicle seat can be achieved with one urging element, so that it is possible to reduce parts count.

At this time, it is preferable that the link member is fixed to the rotating shaft in such an orientation as the distance between the engagement portion and the fixing member is shortest when the center of gravity of the vehicle seat is located on a generally vertical surface including the rotating shaft. In the above-described configuration, since the urging element has only to be set such that the urging force is minimized when the entire length of the urging element is shortest, the adjustment thereof can be omitted.

At this time, it is preferable that the engagement portion has a hole portion to which the urging element is mounted, and the hole portion is provided such that the distance from the fixing member when the vehicle seat is in the storage position is shorter than the distance when the vehicle seat is in the use position. By this configuration, it is possible to shorten the entire length of the urging element when the vehicle seat is in the storage position compared to the entire length when the vehicle seat is in the use position. That is to say, since the urging force with respect to the vehicle seat can be set lower when the vehicle seat is in the storage position, it is possible to reduce the rotational force toward the use position of the vehicle seat by the urging element. Therefore, in the state in which the vehicle seat is moved to the storage position, without weakening the urging force of the urging element, the rotating operation force of the vehicle seat is reduced, and at the same time, it is possible to prevent with certainty bad effects in that the vehicle seat is rattled by vibrations during the vehicle running, for example.

Also, it is preferable that the urging element is mounted between the engagement portion and the fixing member via a rotational supporting member provided on the vehicle body floor side. In this configuration, it is possible to improve with certainty the degree of freedom of installation of the urging element.

As described above, according to the storage assist device for vehicle seat according to various embodiments of the present invention, because of its simple configuration, it is possible to reduce the rotating operation force of the vehicle seat in both the use operation and the storage operation without increasing parts count. Further, by the adjustment of the urging force of the urging element, the adjustment of the rotating operation force of the vehicle seat can easily be performed.

According to the storage assist device for the vehicle seat, since the urging element has only to be set such that the urging force is minimized when the entire length of the urging element is shortest, the adjustment thereof can be omitted.

According to the storage assist device for vehicle seat, the rotating operation force of the vehicle seat is reduced, and at the same time, it is possible to prevent with certainty bad effects in that the vehicle seat is rattled by vibrations during the vehicle running, for example.

According to the storage assist device for vehicle seat, it is possible to, with certainty, improve the degree of freedom of installation of the urging element.

BRIEF DESCRIPTION OF THE DRAWINGS

The invention is described below with reference to various embodiments illustrated in the drawings.

FIG. 3A is a side view showing a state in which the vehicle seat is in a use position;

FIG. 3B is a side view showing a state in which the center of gravity of the vehicle seat is located on the vertical surface including a rotating shaft;

FIG. 3C is a side view showing a state in which the vehicle seat is in a storage position;

FIG. 5 is an enlarged plan view of significant parts of the storage assist device;

FIGS. 7A-E are pictorial illustrative side views showing the operation procedure of the use operation and the storage operation of the vehicle seat;

FIG. 9A is a schematic view showing a case where the hole portion is formed linearly;

FIG. 9B is a schematic view showing a modification of FIG. 9A; and

FIG. 9C is a schematic view showing another modification FIG. 9A;

DETAILED DESCRIPTION OF THE EMBODIMENTS

An embodiment of the present invention will now be described with reference to the accompanying drawings. The members, arrangements, and the like explained below do not restrict the present invention, and can be changed in various ways without departing from the spirit and scope of the present invention.

The figures show one embodiment of the present invention. FIGS. 1 to 9 illustrate a storage assist device for vehicle seat and a vehicle seat provided with a storage assist device in accordance with the present invention. In the figures, FR, PR, and UP denote the front of vehicle, the rear of vehicle, and the upper side of vehicle, respectively. The right and left direction in the following description means the right and left direction in a state where the vehicle seat is oriented to the front of vehicle.

Figure 1:
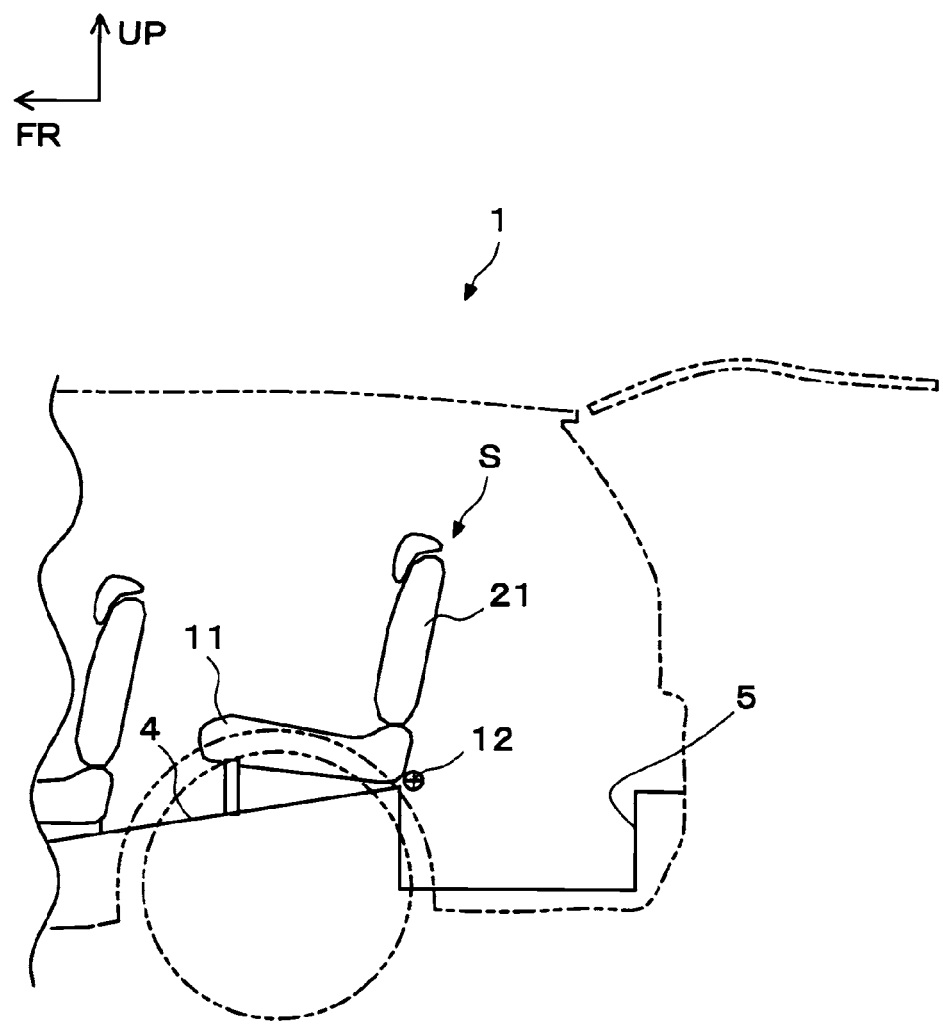
FIG. 1 is a schematic side view of a vehicle rear part provided with a vehicle seat in accordance with an embodiment of the present invention.
Figure 2:
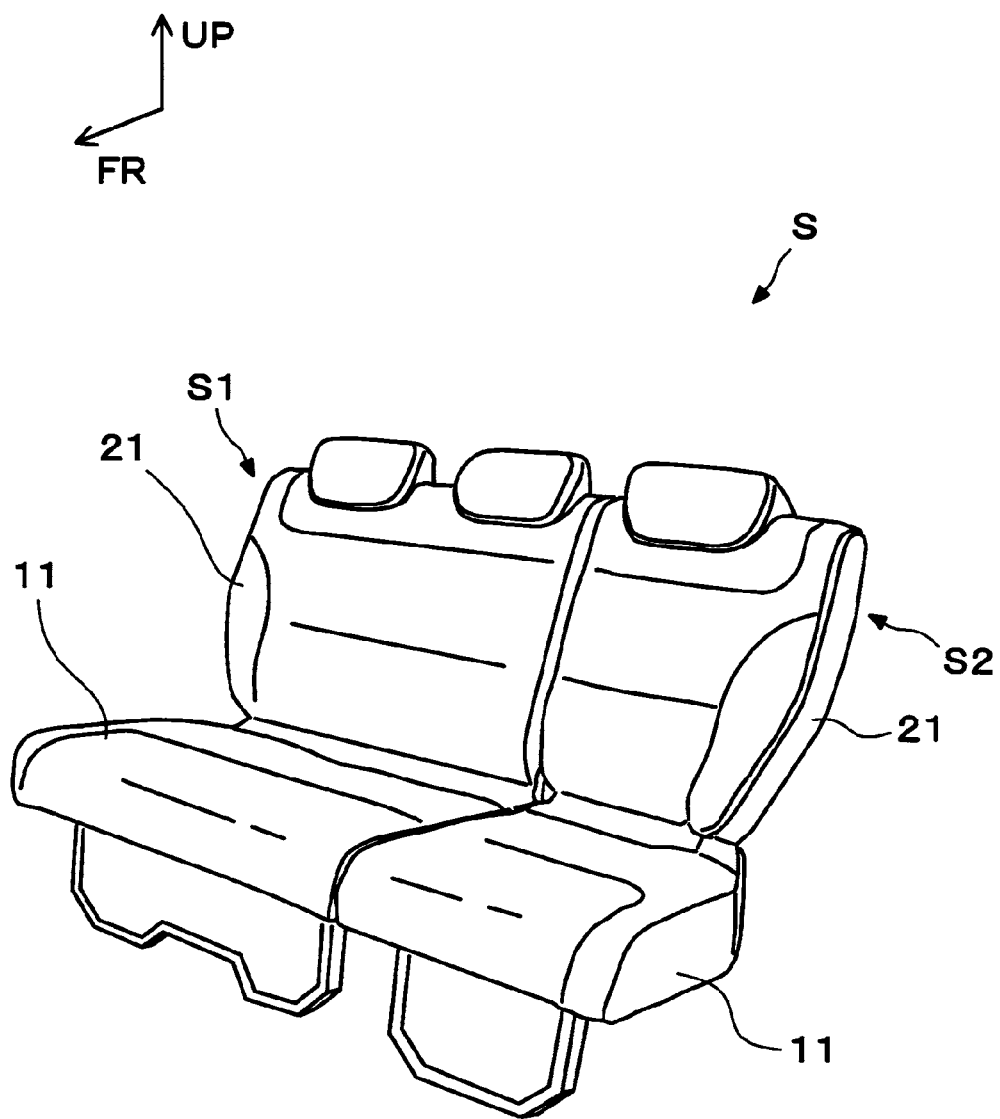
FIG. 2 is a front perspective view of the stowable vehicle seat.

As shown in FIGS. 1 and 2, a vehicle 1 in accordance with the present embodiment is provided with a vehicle seat S constituting the second-row or the third-row rear seat and the like, and in the rear of the vehicle seat S, a storage recess portion 5 that stores the vehicle seat S in a vehicle body floor 4 is provided.

The vehicle seat S has three seats in the right and left, consists of a double left-hand seat S1 located in the left side and a single right-hand seat S2, and is provided with seat cushions 11 and seat backs 21. The seat cushion 11 has a pair of rotating shafts 12, 12 that protrude from the right and left ends to the outside of the width direction at positions located slightly forward than its rear ends, and is supported rotatably with respect to the vehicle body floor 4 about the rotating shafts 12, 12. The seat back 21 is foldably mounted to the seat cushion 11 via a hinge mechanism (not shown) provided at a predetermined position of the rear end side of the seat cushion 11.

Figure 3A:
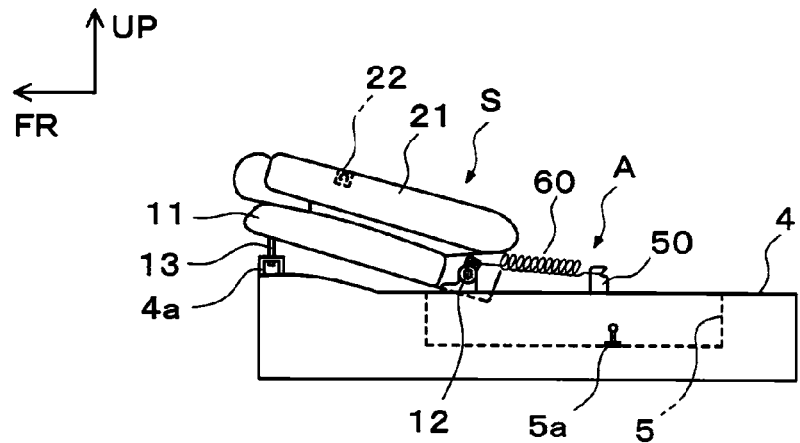
FIGS. 3A-C are side views showing the operation state of the vehicle seat provided with a storage assist device.
Figure 3B:
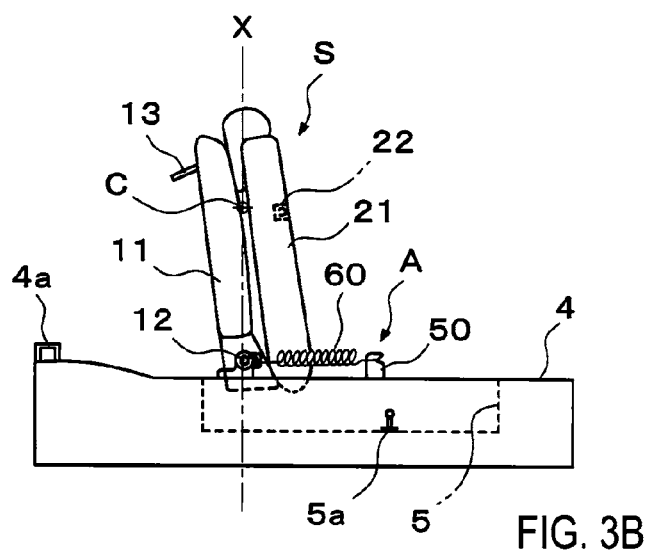
Figure 3C:
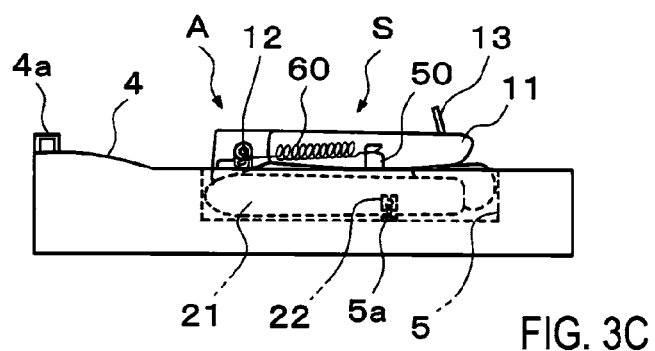

As shown in FIG. 3, the vehicle seat S is movable around the rotating shaft 12 between a storage position (FIG. 3C) in which the vehicle seat S is stored within the storage recess portion 5 and a use position (FIG. 3A) in which the vehicle seat S is disposed on the vehicle body floor 4 and the passengers can be seated, in a state where the seat back 21 is folded onto the seat cushion 11.

In a state where the vehicle seat S is moved to the storage position, an engagement portion 22 provided on the back face side of the seat back 21 and a locking portion 5a provided at a predetermined position of the storage recess portion 5 are engaged, whereby the vehicle seat S is fixed to the storage position with certainty. Also, in a state where the vehicle seat S is moved to the use position, an engagement portion 13 provided on the front end side of the seat cushion 11 and a locking portion 4a mounted at a predetermined position of the vehicle body floor 4 are engaged, whereby the vehicle seat S is fixed to the use position. As described above, the engagement portion 22 and the locking portion 5a are provided in the present embodiment, but as described below, they can be omitted because the rattling of the vehicle seat S can be sufficiently suppressed without them, and they can be miniaturized even if they are provided.

Next, a storage assist device A for vehicle seat in accordance with the present embodiment is explained with reference to FIGS. 3A to 5.

As shown in FIGS. 3A to 5, the storage assist device A is provided with the above-described pair of rotating shafts 12, 12, supporting members 30, link members 40, fixing members 50, and urging springs 60. For example, the storage assist device A is disposed in an enclosed space such as a door lining constituting side faces of the vehicle 1. These supporting members 30, link members 40, fixing members 50, and urging springs 60 are disposed symmetrically in the right and left of the vehicle seat S, and for convenience, the storage assist device A which is disposed on the right side is explained.

The supporting member 30 is made of a metallic component formed into a substantially U-shaped cross-section, and has a bottom wall 31 and side walls 32, 32 bent and extending oppositely to each other toward the upper side from the both ends of the bottom wall 31 respectively. At a predetermined position of the bottom wall 31, a hole (not shown) into which a bolt 71 can be inserted is formed. In each of the pair of side walls 32, 32, a through-hole (not shown) by which the rotating shaft 12 can be passed through the both side walls 32, 32 are formed respectively. The supporting member 30 is fixed by way of bolting to a predetermined position of the vehicle body floor 4 by passing the bolt 71 through the hole. In a state where the supporting member 30 is fixed to the vehicle body floor 4, the rotating shaft 12 fixed to the seat cushion 11 is passed through the through-hole, whereby the vehicle seat S is supported rotatably with respect to the vehicle body floor 4.

The link member 40 is made of a substantially plate-shaped metallic component and has a fixed portion 41 and an engagement portion 42. The fixed portion 41 is fixed by way of welding or the like to the rotating shaft 12. The fixed portion 41 is disposed between the side walls 32, 32 in a state where the rotating shaft 12 is mounted to the supporting member 30. The engagement portion 42 is extended toward the predetermined direction from the rotating shaft 12 to which the fixed portion 41 is fixed and is movable in conjunction with the rotating operation of the vehicle seat S. In the engagement portion 42, a long hole 43 is formed. The long hole 43 has one end 43a provided at a position adjacent to the rotating shaft 12 and the other end 43b provided at a position more spaced from the rotating shaft 12 than the one end 43a, and to the long hole 43, one end 60a of the urging spring 60 described below is hooked and mounted to be movable within the long hole. In addition, the long hole 43 corresponds to a hole portion as defined in the claims.

Figure 4A:
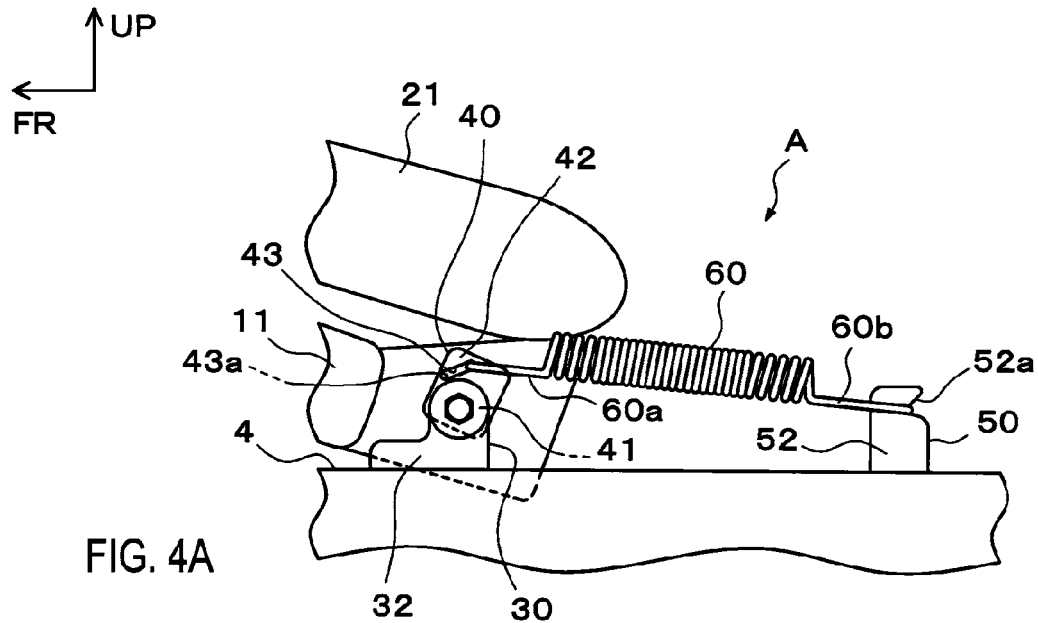
FIGS. 4A-C are enlarged side views of significant parts of FIGS. 3A-C, respectively.
Figure 4B:
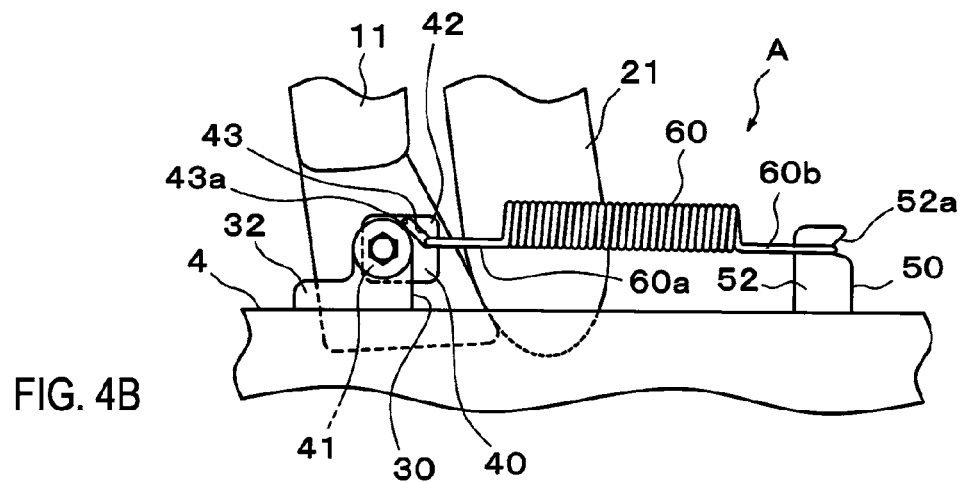
Figure 6:
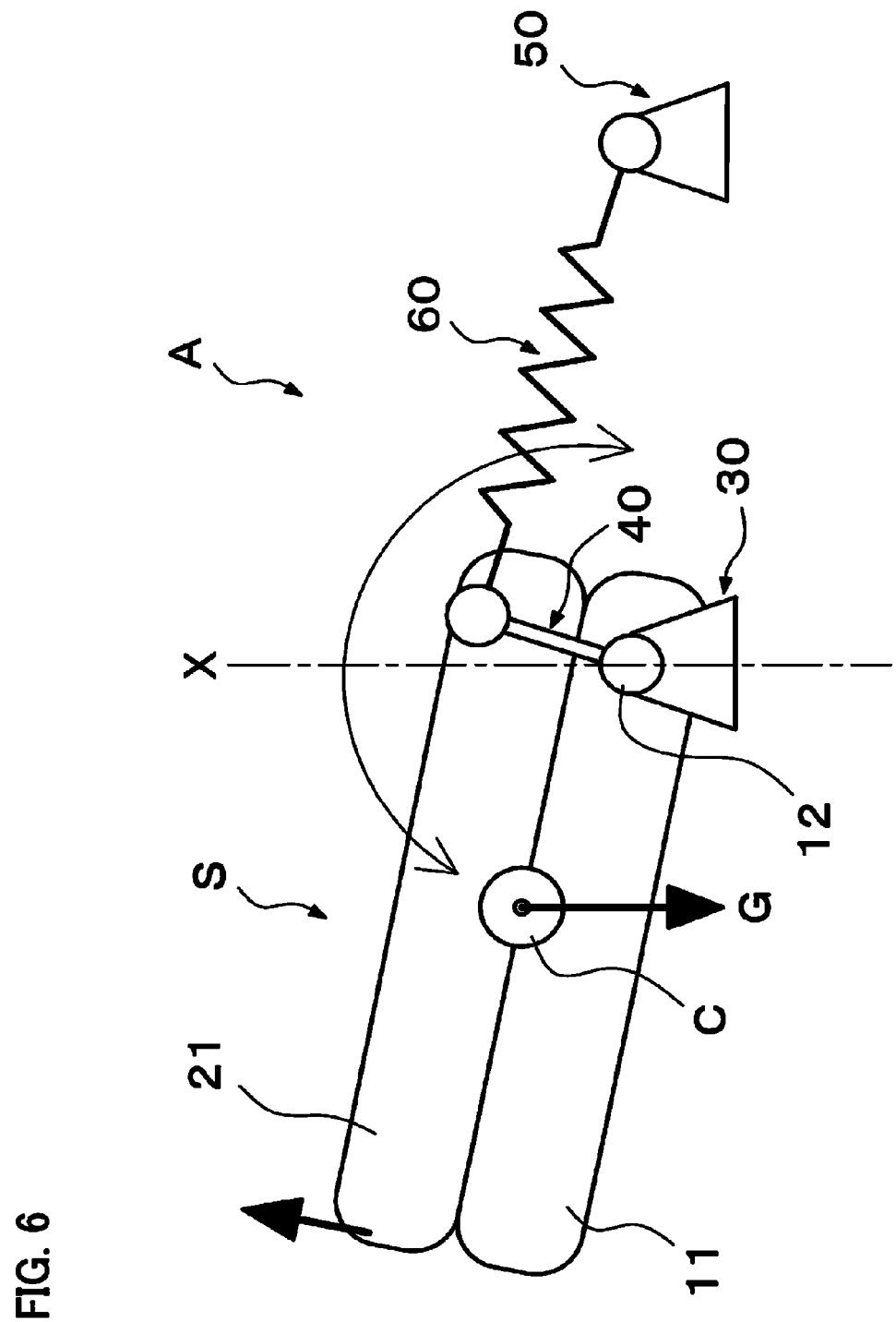
FIG. 6 is a schematic side view of the storage assist device.

As shown in FIG. 4B, when a center of gravity C of the vehicle seat S is located on a vertical surface X including the rotating shaft 12 by the rotating operation of the vehicle seat S, the link member 40 is fixed to the rotating shaft 12 such that the extending direction of the engagement portion 42 from the rotating shaft 12 is oriented to the direction approximately same as the extension direction of the urging spring 60 (see FIGS. 3B and 6).

Also, as shown in FIGS. 4A-C and 9A, the long hole 43 is formed such that the distance between the end located on the fixing member 50 side (the one end 43a or the other end 43b) and the fixing member 50 when the vehicle seat S is in the storage position is shorter than the distance when the vehicle seat S is in the use position.

As shown in FIGS. 3A to 5, the fixing member 50 is made of a metallic component formed into a substantially L-shaped cross-section and is mounted to the vehicle rear side than the supporting member 30 with respect to the vehicle body floor 4. The fixing member 50 has a bottom wall 51 and side walls 52 bent and extending to the upper side from one end of the bottom wall 51. In a predetermined position of the bottom wall 51, a hole (not shown) in which a bolt 72 can be inserted is formed. The fixing member 50 is fixed by way of bolting to a predetermined position of the vehicle body floor 4 by passing the bolt 72 through the hole. In a state where the fixing member 50 is fixed to the vehicle body floor 4, a notch 52a is formed in the vehicle rear side end of the side wall 52. To the notch 52a, the other end 60b of the urging spring 60 described below is mounted.

The urging spring 60 has the one end 60a and the other end 60b, and these are formed into a hook-shape respectively. The one end 60a and the other end 60b are mounted to the long hole 43 of the link member 40 and the notch 52a of the fixing member 50 respectively, and the urging spring 60 is provided in a tensioned condition between the link member 40 and the fixing member 50.

Next, the operation of the storage assist device A is explained with reference to FIGS. 3 to 7.

As shown in FIGS. 3A, 4A, and 7A to C, to move the vehicle seat S from the use position to the storage position, firstly, the seat back 21 is folded onto the seat cushion 11. In this state, the engaged condition of the engagement portion 13 of the seat cushion 11 and the locking portion 4a of the vehicle body floor 4 is released.

In a state where the vehicle seat S is set to the use position, the one end 60a of the urging spring 60 is located at the other end 43b of the long hole 43, and the urging force of the urging spring 60 acts on the engagement portion 42 side of the link member 40. That is to say, in the initial operation when the vehicle seat S is moved from the use position to the storage position, since the urging force (assist force) acting in the storage position direction (hereinafter referred to as the storage rotating direction) of the urging spring 60 is transmitted to the vehicle seat S via the link member 40 and the rotating shaft 12, the operation load of the vehicle seat S can be reduced.

Figure 8:
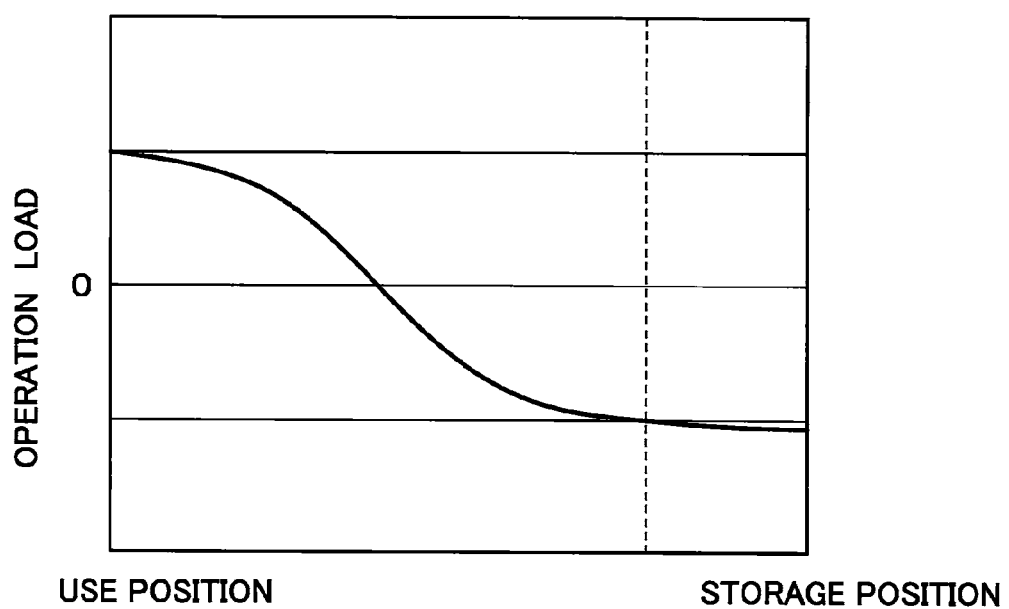
FIG. 8 is a graph showing the relationship between the operation load and the rotating angle of the vehicle seat.

As shown in FIGS. 3B, 4B, and 7D, in a state where the center of gravity C of the vehicle seat S is located on the vertical surface X including the rotating shaft 12, the extending direction of the engagement portion 42 of the link member 40 substantially corresponds with the extension direction of the urging spring 60. Therefore, the urging force of the urging spring 60 is minimized, and as shown in FIG. 8, the rotate moment by its own weight G of the vehicle seat S becomes zero. That is to say, in a case where the vehicle seat S is moved in the storage rotating direction, since the urging force in the extension direction is increased by the extension of the urging spring 60, it is possible to reduce the rotational speed by its own weight G of the vehicle seat S (see FIGS. 6 and 8).

Figure 4C:
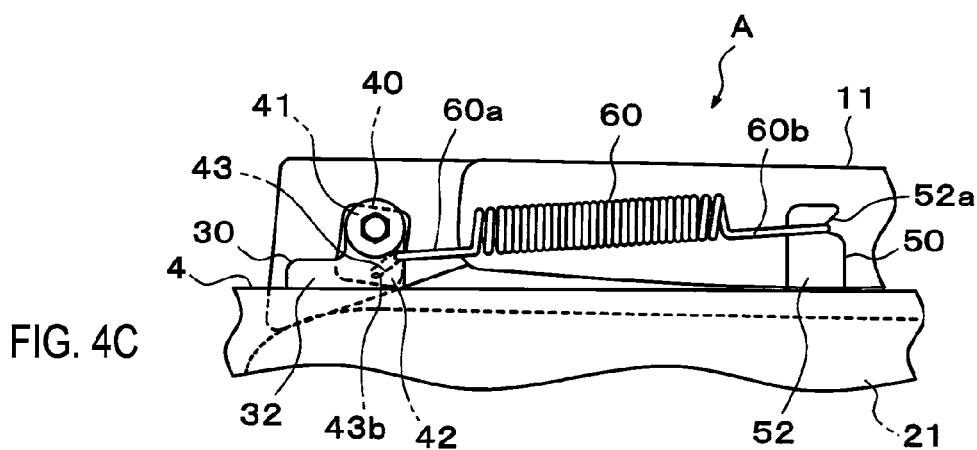

As shown in FIGS. 3C, 4C, and 7E, when the vehicle seat S is moved to the storage position, the engagement portion 22 of the seat back 21 and the locking portion 5a of the storage recess portion 5 are engaged and the vehicle seat S is fixed to the storage position. In a state where the vehicle seat S is changed in position to the storage position, along with the movement in the storage rotating direction of the vehicle seat S, the one end 60a of the urging spring 60 is moved to the one end 43a from the other end 43b of the long hole 43. Also, in this state, a distance x' between the one end 60a of the urging spring 60 and the fixing member 50 is set shorter compared to a distance x when the vehicle seat S is in the use position (see FIG. 9). That is to say, in the state in which the vehicle seat is in the storage position, since the urging force in the use position direction (hereinafter referred to as the use rotating direction) of the urging spring 60 with respect to the link member 40 is reduced, the operation load in the use rotating direction of the vehicle seat S is reduced, and at the same time, it is possible to prevent bad effects in that the vehicle seat S is rattled by vibrations during the vehicle running, for example.

Next, the operation of the storage assist device A when the vehicle seat S is moved from the storage position to the use position is explained.

As shown in FIGS. 3C and 7E, to move the vehicle seat S from the use position to the storage position, firstly, the engagement condition of the engagement portion 22 of the seat back 21 and the locking portion 5a of the storage recess portion 5 is released.

As shown in FIGS. 4B and C, when the vehicle seat S is moved to the use rotating direction, along with the movement, the one end 60a of the urging spring 60 is moved from the fixed portion 41 side to the engagement portion 42 side of the long hole 43. Thereby, the urging force in the use rotating direction of the urging spring 60 is well transmitted to the vehicle seat S via the link member 40 and the rotating shaft 12, so that the operation load of the vehicle seat S can be reduced.

As described above, in the state in which the center of gravity C of the vehicle seat S is located on the vertical surface X including the rotating shaft 12, the urging force of the urging spring 60 is minimized and the rotate moment by its own weight of the vehicle seat S becomes zero. Further, in the case where the vehicle seat S is moved in the use rotating direction, since the urging force in the extension direction is increased by the extension of the urging spring 60, it is possible to reduce the rotational speed by its own weight G of the vehicle seat S (see FIGS. 6 and 8).

Then, as shown in FIG. 3A, when the vehicle seat S is moved to the use position, the engagement portion 13 of the seat cushion 11 and the locking portion 4a of the vehicle body floor 4 are engaged and the vehicle seat S is fixed to the use position.

Thus, according to the present embodiment, when the center of gravity C of the vehicle seat S is located on the vertical surface X including the rotating shaft 12, the urging force of the urging spring 60 is minimized. That is to say, as shown in FIG. 8, in the case where the vehicle seat S is moved between the use position and the storage position, until the center of gravity C of the vehicle seat S reaches on the vertical surface X including the rotating shaft 12, the urging force of the urging spring 60 acts on the vehicle seat S via the link member 40 and the rotating shaft 12, so that the rotating operation force of the vehicle seat S is assisted. Then, when the center of gravity C of the vehicle seat S is located on the vertical surface X including the rotating shaft 12, the rotate moment by its own weight G of the vehicle seat S, that is, the operation load of the vehicle seat S becomes zero. After the center of gravity C of the vehicle seat S reaches on the vertical surface X including the rotating shaft 12, the vehicle seat S is moved against the urging force in the extension direction of the urging spring 60, so that the vehicle seat S can be moved to the use position or the storage position while controlling the rotational speed by its own weight of the vehicle seat S. Therefore, the rotating operation force of the vehicle seat S can be reduced in both the use operation and the storage operation of the vehicle seat S.

Also, as shown in FIG. 8, in the present embodiment, along with the rotating operation of the vehicle seat S, the urging force of the urging spring 60 is reduced until the center of gravity C of the vehicle seat S reaches on the vertical surface X including the rotating shaft 12, and the urging force of the urging spring 60 is increased after it reaches thereon. That is to say, through the adjustment of the urging force of the urging spring 60, the operation load of the vehicle seat S can be usually set to be zero, for example. Therefore, by way of such an adjustment, inconveniences such as rising of the vehicle seat S can be prevented with certainty and it is also possible to operate the vehicle seat S without feeling weight.

Also, the urging spring 60 has only to be hooked between the engagement portion 42 of the link member 40 and the fixing member 50 fixed to the vehicle body floor to complete its installation, so that the installation and the replacement thereof can easily be performed. Also, the reduction of the rotating operation force of the vehicle seat S is achieved with one urging spring 60, so that parts count can be reduced.

Further, since the storage assist device A is disposed in an enclosed space such as a door lining constituting side faces of the vehicle 1, it is possible to facilitate the movement of the entire storage assist device A without any entry of dust. In addition, the storage assist device A may be applied to the case where it is stored within the door lining, while the storage assist device may also be stored within a dedicated cover.

Figure 9A:
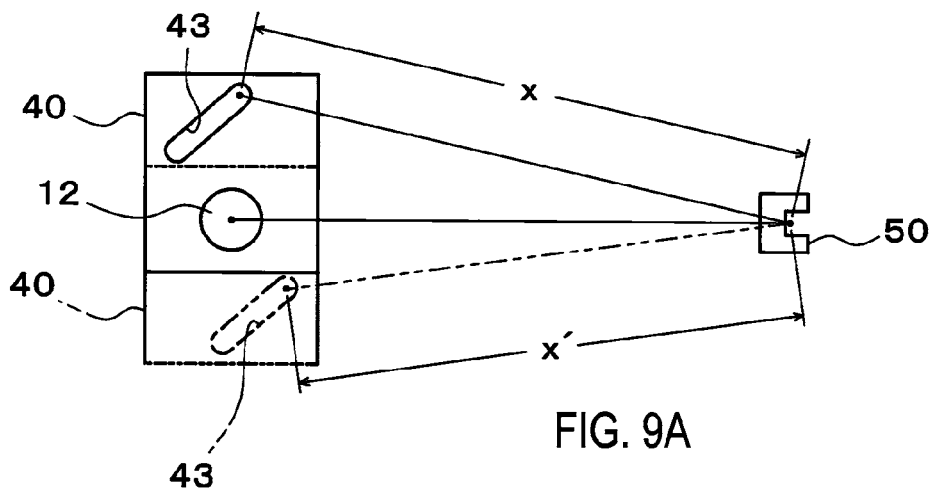
FIGS. 9A-C are schematic views showing the distance between the hole portion formed in the link member and the fixing member.

Further, in the present embodiment, when the vehicle seat S is moved to the storage position, the one end 60a of the urging spring 60 is moved to the one end 43a from the other end 43b of the long hole 43. At this time, as shown in FIG. 9A, the distance x' from the one end 43a to the fixing member 50 when the vehicle seat S is moved to the storage position is set shorter than the distance x from the other end 43b to the fixing member 50 when the vehicle seat S is moved to the use position. That is to say, in the case where the vehicle seat S is in the storage position, since the urging force with respect to the vehicle seat S can be set lower, it is possible to reduce the rotational force to the use position direction of the vehicle seat by the urging spring 60. Therefore, in the state in which the vehicle seat S is moved to the storage position, without weakening the urging force of the urging spring 60, that is, the rotating operation force of the vehicle seat S is reduced, and at the same time, it is possible to prevent bad effects with certainty in that the vehicle seat S is rattled by vibrations during the vehicle running, for example.

Figure 9B:
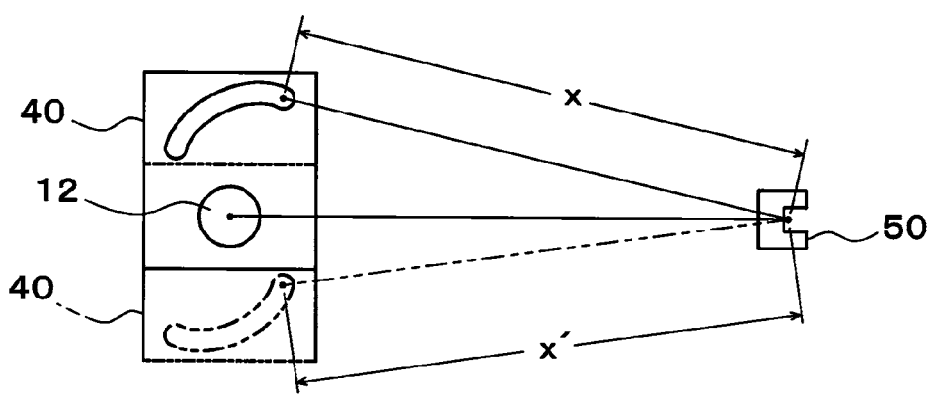
Figure 9C:
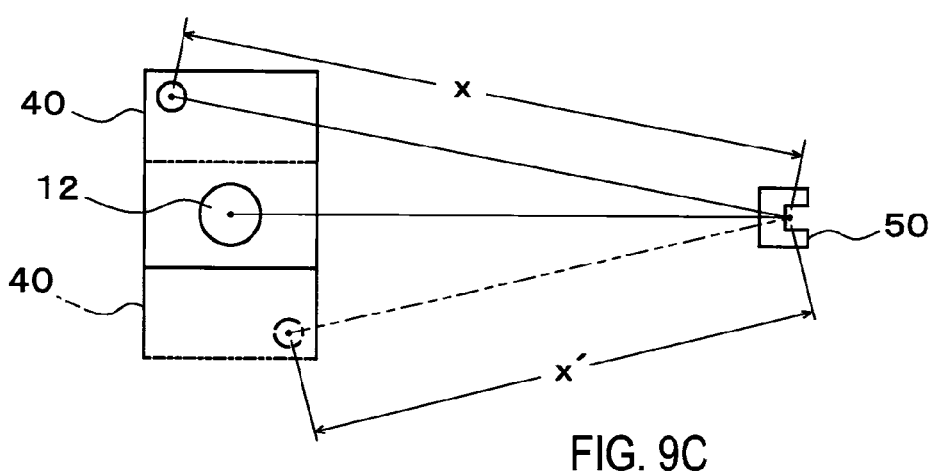

Thus, in the present embodiment, at the storage position of the vehicle seat S, the vehicle seat S is fixed to the storage position by engaging the engagement portion 22 of the seat back 21 and the locking portion 5a of the storage recess portion 5, but it is possible to sufficiently suppress the rattling of the vehicle seat S even if these engagement elements are omitted. In addition, in the present embodiment, although the long hole 43 is formed linearly, as long as the hole portion is formed such that the distance between the end of the hole portion 43 and the fixing member 50 when the vehicle seat S is in the storage position is shorter than the distance when the vehicle seat S is in the use position, the hole portion may be formed into a circular arc shape as shown in FIG. 9B, and may also be formed into a round-hole as shown in FIG. 9C, or any other related shape.

Figure 10:
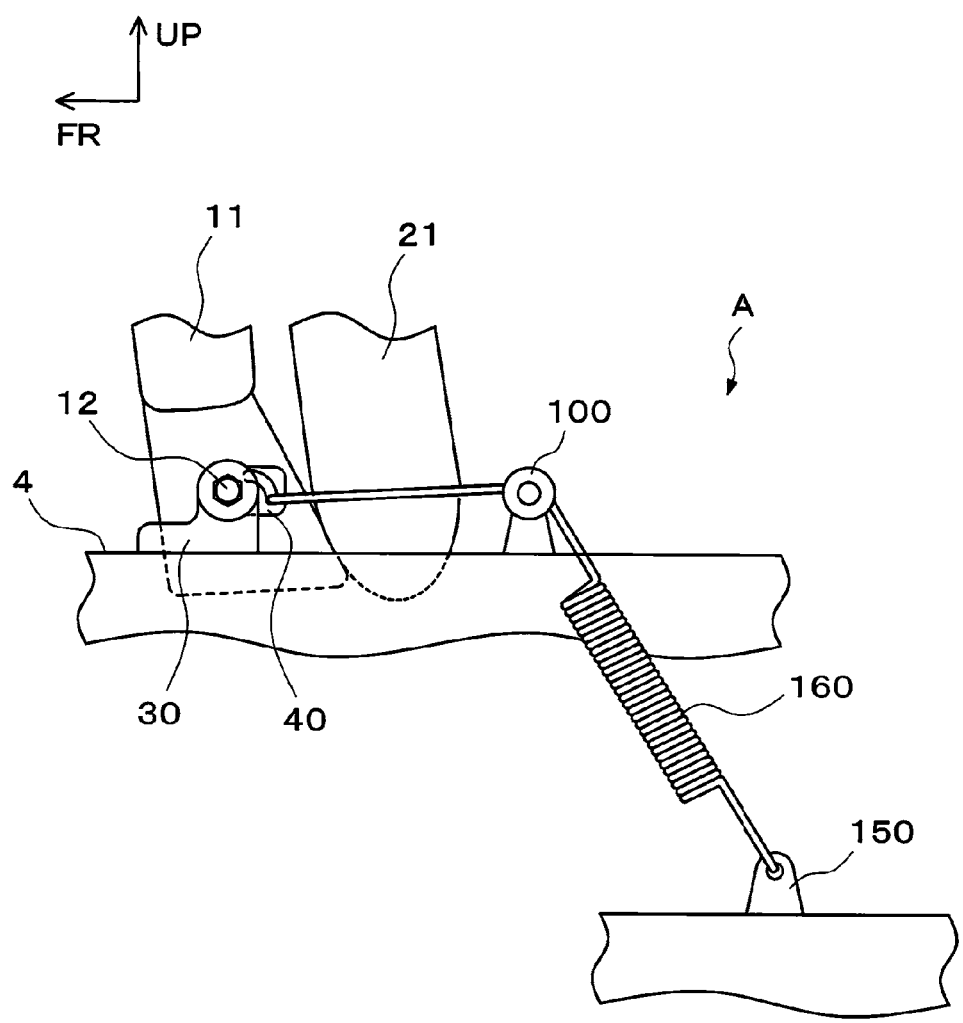
FIG. 10 is a side view showing another example of the storage assist device in accordance with the present embodiment.

Also, in the present embodiment, although the urging spring 60 is mounted directly to the link member 40 and the fixing member 50, it is also possible to mount an urging spring 160 to a link member 140 and a fixing member 150 via a rotational supporting member 100 such as a pulley, as shown in FIG. 10. In this configuration, even if the installation space of the urging spring 160 is limited, the urging spring 160 can be mounted to a movable end of the link member 40 and the fixing member 150 via the rotational supporting member 100, so that it is possible to certainly improve the degree of freedom of installation of the urging spring 160.

Figure 11:
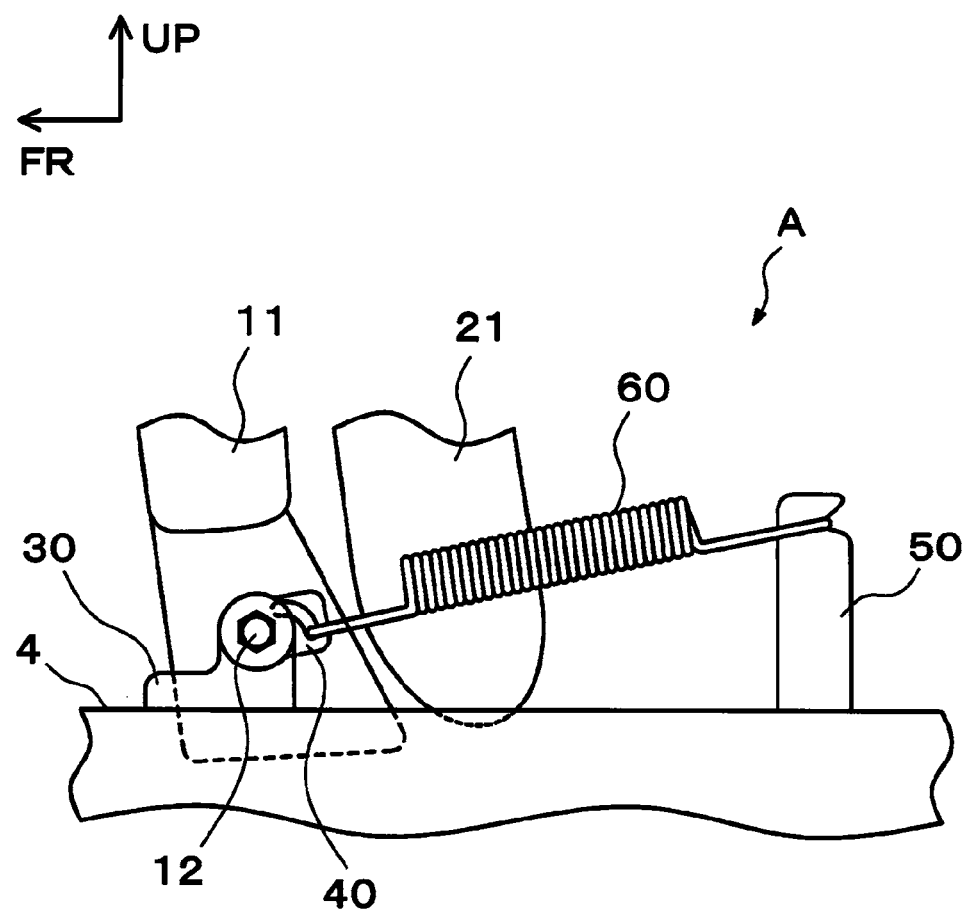
FIG. 11 is a side view showing a still another example of the storage assist device in accordance with the present embodiment.

Further, in the present embodiment, the installation heights of the rotating shaft 12 and the fixing member 50 to which the urging spring 60 is mounted are substantially horizontal, but not limited thereto, as shown in FIG. 11, the heights may be different therefrom.

Even if the storage assist device as shown in FIGS. 10 and 11 is configured, when the center of gravity of the vehicle seat is located on the vertical surface including the rotating shaft, the same operation effects as the above described embodiment can be obtained by mounting the link member to the rotating shaft in such an orientation as the entire length of the urging spring is shortest.

In the present embodiment, the urging spring is employed as the urging element that can apply the urging force in the extension direction, but various urging element such as a damper may be employed. In this case, depending on the entire length of the respective urging element, the present invention can be applied by changing appropriately the position at which the fixing member is disposed. Also, in addition to the urging element that imparts the urging force in the extension direction, the present invention can also be realized by using an urging element that can apply the urging force in another direction such as a compression spring, for example.

Also, in the present embodiment, although the rotating shaft 12 is provided slightly forward than the rear end of the seat cushion 11, in the state in which the seat cushion 11 is in the use position, the rotating shaft may be provided at another position if that position is in the rear side than the position of the center of gravity C of the seat cushion 11.

Accordingly, because of its simple configuration, the rotating operation force of the vehicle seat in both the use operation and the storage operation can be reduced without increasing a parts count and the adjustment of the rotating operation force of the vehicle seat can easily be performed, so that the storage assist device can be applied to various stowable vehicle seats.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A storage assist device for vehicle seat that has a seat cushion supported rotatably with respect to a vehicle body floor and a seat back supported foldably with respect to the seat cushion and selectively changes in position between a use position and a storage position in a state where the seat back is folded down, comprising:
    a supporting member mounted on a vehicle body floor side for supporting a rotating shaft fixed to the seat cushion;
    a link member having a fixed portion fixed to the rotating shaft and an engagement portion provided at a position spaced from the fixed portion;
    a fixing member provided on the vehicle body floor side and disposed at a position spaced at a predetermined distance from the supporting member; and
    an urging element that applies an urging force in an urging direction, one end of the urging element is attached to the engagement portion of the link member and an other end of the urging element is attached to the fixing member;
wherein:
    the link member is fixed to the rotating shaft in such an orientation so that the distance between the engagement portion and the fixing member is shortest when a center of gravity of the vehicle seat is located on a substantially vertical plane including the rotating shaft;
    the engagement portion comprises an elongate hole;
    the one end of the urging element is engaged with and movable in the elongate hole in a direction of the elongation; and
    the urging element is set such that the urging force is minimized when the center of gravity of the vehicle seat is located on the substantially vertical plane including the rotating shaft.

2. The storage assist device for vehicle seat according to claim 1, wherein
    the elongate hole provided such that the distance from the fixing member when the vehicle seat is in the storage position is shorter than the distance when the vehicle seat is in the use position.

3. The storage assist device for vehicle seat according to claim 1, wherein the urging element is mounted between the engagement portion and the fixing member via a rotational supporting member provided on the vehicle body floor side.

4. The storage assist device for vehicle seat according to claim 2, wherein the urging element is mounted between the engagement portion and the fixing member via a rotational supporting member provided on the vehicle body floor side.

5. A storage assist device for vehicle seat that has a seat cushion supported rotatably with respect to a vehicle body floor and a seat back supported foldably with respect to the seat cushion and selectively changes in position between a use position and a storage position in a state where the seat back is folded down, comprising:
    a supporting member mounted on a vehicle body floor side for supporting a rotating shaft fixed to the seat cushion;
    a link member having a fixed portion fixed to the rotating shaft and an engagement portion provided at a position spaced from the fixed portion;
    a fixing member provided on the vehicle body floor side and disposed at a position spaced at a predetermined distance from the supporting member; and
    an urging element mounted between the engagement portion of the link member and the fixing member that applies an urging force in an urging direction;
wherein:
    the urging element is set such that the urging force is minimized when a center of gravity of the vehicle seat is between the use position and the storage position; and
    the urging element is mounted between the engagement portion and the fixing member via a rotational supporting member provided on the vehicle body floor side.

6. A storage assist device for vehicle seat that has a seat cushion supported rotatably with respect to a vehicle body floor and a seat back supported foldably with respect to the seat cushion and selectively changes in position between a use position and a storage position in a state where the seat back is folded down, comprising:
    a supporting member mounted on a vehicle body floor side for supporting a rotating shaft fixed to the seat cushion;
    a link member having a fixed portion fixed to the rotating shaft and an engagement portion provided at a position spaced from the fixed portion;
    a fixing member provided on the vehicle body floor side and disposed at a position spaced at a predetermined distance from the supporting member; and
    an urging element mounted between the engagement portion of the link member and the fixing member that applies an urging force in an urging direction,
wherein:
    the urging element is set such that the urging force is:
        minimized when a center of gravity of the vehicle seat is between the use position and the storage position; and
        in a horizontal direction relative to the vehicle body floor.

7. The storage assist device for vehicle seat according to claim 1, wherein an axis of the rotating shaft is located between a first plane defining a bottom surface of the seat cushion and a second plane defining a rear surface of the seat back.

8. The storage assist device for vehicle seat according to claim 1, wherein the one end of the urging element and the other end of the urging element define a line that is parallel to a line defined by a rear end of the seat cushion and a front end of the seat cushion when the seat is in the storage position.

9. The storage assist device for vehicle seat according to claim 6, wherein an axis of the rotating shaft is located between a first plane defining a bottom surface of the seat cushion and a second plane defining a rear surface of the seat back.

10. The storage assist device for vehicle seat according to claim 6, wherein one end of the urging element and an other end of the urging element define a line that is parallel to a line defined by a rear end of the seat cushion and a front end of the seat cushion when the seat is in the storage position.

* * * * *